Sept. 29, 1925.
H. A. ZIOLA
HEATING UNIT
Filed Feb. 5, 1925
1,555,543
2 Sheets-Sheet 1
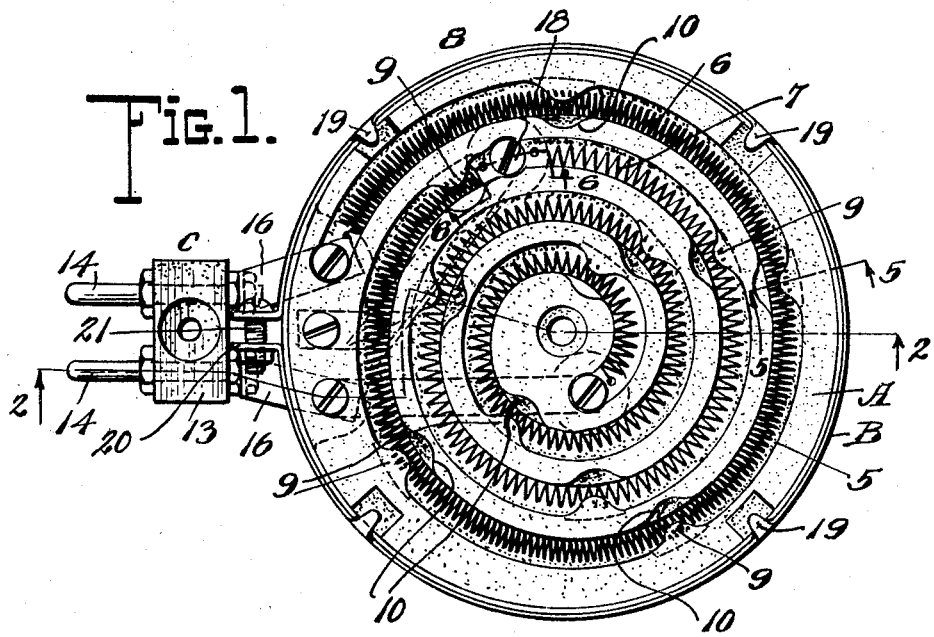
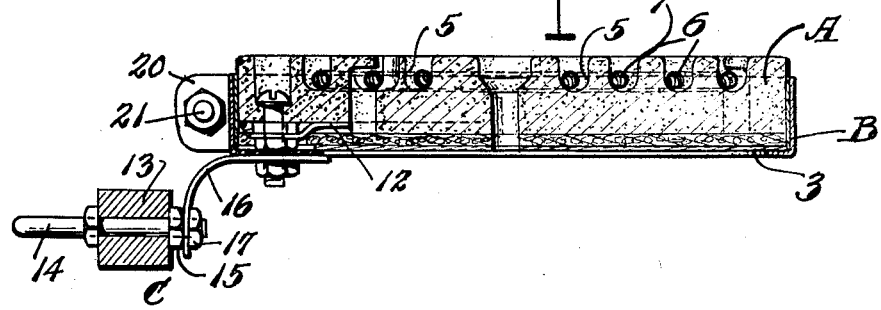
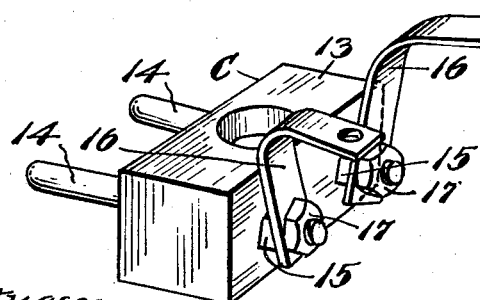
Witness:
E. W. Wagner.
Inventor
Henry A Ziola
By Robb, Robb & Hill
Attorney Sept. 29, 1925. 1,555,543
H. A. ZIOLA
HEATING UNIT
Filed Feb. 5, 1925 2 Sheets-Sheet 2
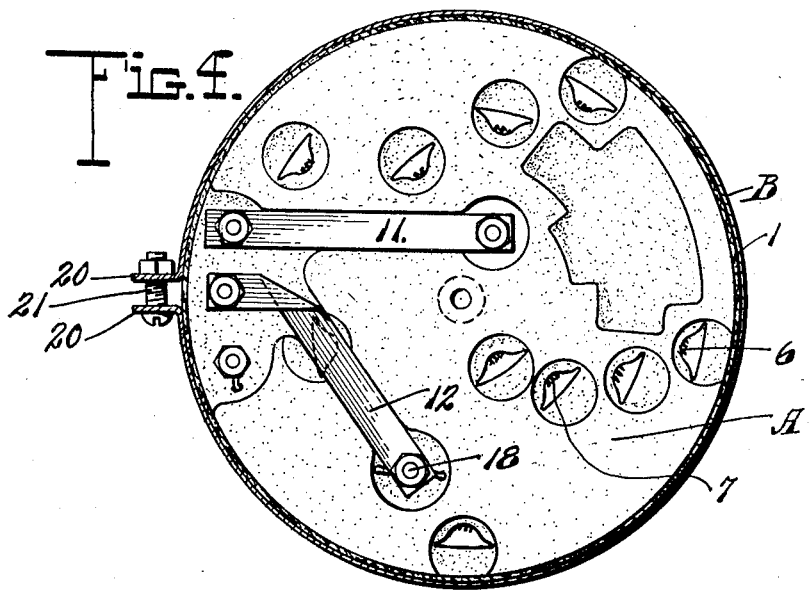
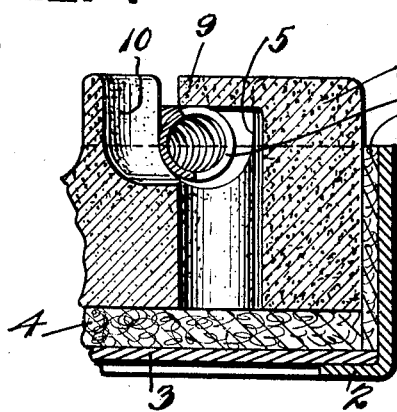
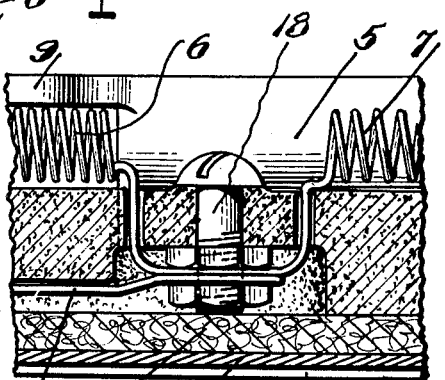
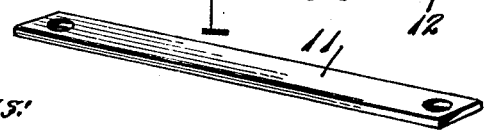
Inventor
Henry A. Ziola Patented Sept. 29, 1925.

1,555,543

UNITED STATES PATENT OFFICE.

HENRY A. ZIOLA, OF TOLEDO, OHIO, ASSIGNOR TO THE SWARTZBAUGH MANUFACTURING COMPANY, OF TOLEDO, OHIO.

HEATING UNIT.

Application filed February 5, 1925. Serial No. 7,110.

*To all whom it may concern:*

Be it known that I, HENRY A. ZIOLA, a citizen of Austria, residing at Toledo, in the county of Lucas and State of Ohio, have invented certain new and useful Improvements in Heating Units, of which the following is a specification.

A novel improved heating unit for electric hot plates, or like stoves, is the subject of this invention.

Among the objects had in mind by me in the development of my invention are:

The provision of a heating unit of the class referred to in which the heating element may be quickly assembled in relation to its insulation base ordinarily provided for these elements; the provision of a novel means permitting the quick application of the heating element to the base, as above noted, and forming an effective means for preventing the displacement of said element; the formation of the heating element in sections, each of which is made up of a coiled length of suitable resistance wire, but with the sections coiled in such a manner that the coils of the section or sections closer to the middle of the insulation base are farther apart than the coils of the sections more remote from said center, whereby uniformity of heat radiation over the base is obtained, and the production of an exceptionally hot heating zone at the center of the heating unit is avoided; and the provision of specific features of novelty, including a special terminal block or unit with which the terminals or terminal plates connected with the heating elements may be connected, and other structural features including a metal casing element surrounding the insulation base.

A full understanding of my invention will be had upon reference to the accompanying drawings and the following detailed description of the parts and their operation:

Figure 1 is a plan view of one preferred form of my heating unit.

Figure 2 is a cross sectional view taken about on the line of 2—2 of Figure 1.

Figure 3 is a perspective of the terminal assembly unit or block.

Figure 4 is a bottom plan view of the heating unit showing certain terminal plates which may be advantageously employed.

Figure 5 is a fragmentary sectional view taken about on the line 5—5 of Figure 1, bringing out more clearly the relation of the coiled heating element to the overhanging lug structure of the spiral groove.

Figure 6 is a fragmentary sectional view bringing out more clearly the method of connection of a terminal plate with certain heating elements.

Figure 7 is a detailed perspective view of one of the terminal plates.

Referring to Figures 2, 5, and 6, it will be observed that my heating unit generally comprises an insulation base "A" seated in an annular casing "B," between which and the base is interposed an annular strip of insulation, designated 1. The casing "B" has a flange 2 at its bottom portion which supports a bottom plate 3, between which and the insulation base "A" is interposed a suitable insulation disc of asbestos or the like, denoted 4.

The insulation base "A" is provided in its upper surface with a relatively shallow spiral groove 5, attached to receive the sections 6, 7, and 8, constituting a sectional heating element.

I draw attention particularly to the fact that in my construction I make the section 8 of the heating element with its coils somewhat more greatly spaced apart than the coils of the section 7. Likewise the coils of the section 7 are spaced apart a greater extent than are coils of the section 6. My object in this construction is to provide for the radiation of heat from the sections of the heating element in such a manner that said radiation is substantially uniform from the center of the heating unit outwardly toward its periphery.

With my invention there is not provided at the center of the heating unit a heating zone where the heat is concentrated greatly, when a utensil is placed upon the heating unit, by which concentrated heat liability of damaging the utensil, or other object to be heated, is caused, not to mention the disadvantages of creating unnecessary heat in the heating element section 8, which heat in some types of hot plates tends to the destruction of the element itself.

The heating element sections 6, 7, and 8, are retained in the spiral groove 5 by the lugs 9, integrally formed with the insulation base in the molding thereof and overlapping the heating element coils. These lugs are best seen in Figure 5, and they retain the heating element sections in place by overlying the latter.

It will be noticed that opposite each of the lugs 9 of the insulation base 8, the groove 5 is formed with a lateral recess or clearance space 10. This is a very important feature of construction because by the provision of the sets of lugs 9 and recesses 10, I am enabled by a simple lateral deflection of the coiled element 6, or 7, or 8, to insert said element face downwardly into its particular portion of the groove 5, and once it has been pushed into the groove in this manner the coils resume their normal relation substantially in alignment causing them to spring beneath the lugs 9. By these provisions I find that I am enabled to assemble the insulation bases and heating elements of hot plate stoves of this type far more quickly than is permitted in known types of such constructions at present most commonly in use. The disadvantageous threading of the heating element into the spiral or other form of groove in the insulation base is avoided, together with the time and trouble incident thereto, which in a factory means definite expense in the labor item.

I provide terminal plates 11 and 12, for connecting terminals of the heating element with the terminal assembly unit "C," which unit comprises a block 13 of insulation substance, terminal members 14 permanently secured to and passing through said block and attached thereto by nuts 15. This terminal assembly unit "C" enables me to dispense with the use of porcelain bushings, at present so commonly employed to insulate the terminal portions of wires connected with the heating elements of electric hot plate stoves. Obviously the terminal connecting plates 16 may be advantageously attached to the terminal members 14 by the nuts 17, and in this way I produce an excellent assembly unit, cheaply made and very advantageous from a commercial viewpoint for the purposes thereof.

The sections of the heating unit, 6, 7, and 8, may be used together, or separately, dependent upon the element of the terminal plates employed, but as this is an idea well known in the art I lay no special stress thereon.

I preferably make the terminal plates 11 and 12 of nickel and I preferably use a resistance wire of nickel chromium in order to obtain a long life of this element.

Suitable fastening bolts 18 will be used to connect the terminal plates and the ends of the heating unit sections, as shown in Figure 6.

From the annular casing "B" I project integral lugs 19 to overlap the insulation base "A" to hold the parts in proper relation, and I preferably connect the spaced ends 20 of the casing "B" by means of a clamping bolt or similar fastening 21.

Having thus described my invention what I claim as new and desire to secure by Letters Patent of the United States, is:

1. A heating unit for electric hot plate stoves comprising a base of insulation, said base provided with a groove on its surface to receive a heating element, and a heating element disposed in said groove and comprising sections, the sections of the heating element nearer the center of the base comprising coils spaced apart a greater extent than those of the sections more remote from the said center.

2. A heating unit for electric hot plate stoves, comprising a base, and a heating element supported by the base and comprising coiled elements, extending from the central portion of the base to the outer portion of the latter, the coils of said elements adjacent to the central portion being spaced apart a greater extent than those coils more remote from the said center, whereby uniformity of the heating of the elements is established over the whole area of the base.

3. A heating unit for electric hot plate stoves comprising a base, and electric heating means carried by the said base comprising a heating element divided into a plurality of sections and disposed in a spiral manner extending from a point adjacent to the center of the base to the outermost portion of the base, the sections of the heating element each comprising coils of uniform diameter, the coils of the heating element of the section nearest the center of the base being spaced a greater distance than the coils of the section next remote from the center, and so on, whereby the heating element is caused to uniformly heat over the whole area of the base from the center outward.

4. A heating unit for electric hot plate stoves, comprising a base of insulation having a surface groove to receive a heating element, said surface groove being formed in the walls thereof, with sets of short lugs on one wall extending to overlie the groove, and short clearance spaces provided in the other wall of the groove opposite the lugs substantially as set forth, and a heating unit in the groove engaged beneath the lugs.

5. A heating unit for electric hot plate stoves comprising a base of insulation having a surface groove to receive a heating element, said surface groove being formed in the walls thereof, with sets of lugs on one wall extending to overlie the groove, and clearance spaces provided in the other wall of the groove opposite the lugs substantially as set forth, and a heating element in the groove engaged beneath the lugs, the heating element comprising coiled resistance wire, the coils of which are adapted to be deflected laterally to cause them to enter the said clearance spaces so as to be sprung beneath the said lugs of the insulation base.

6. A heating unit structure comprising an insulation base, a heating element mounted upon the upper surface of the base, an annular casing of metal surrounding the base and having spaced end portions, a connection for said end portions to clamp the casing around the base, a band of insulation between said annular casing and the base, and terminal connections for the heating element.

7. A heating unit structure comprising an insulation base, a heating element mounted upon the upper surface of the base, an annular casing of metal surrounding the base and having spaced end portions, a connection for said end portions to clamp the casing around the base, a band of insulation between said annular casing and the base, and terminal connections for the heating element comprising nickel plates attached to the terminals of the heating element and to the base.

8. A heating unit for electric hot plate stoves comprising a base of insulation having a surface groove to receive a heating element, said surface groove being formed in the walls thereof with sets of lugs on one wall extending to overlie the groove, and clearance spaces provided in the other wall of the groove opposite the lugs substantially as set forth, and a heating element in the groove engaged beneath the lugs, the heating element comprising coiled resistance wire, the coils of which are adapted to be deflected laterally to cause them to enter the said clearance spaces so as to be sprung beneath the said lugs of the insulation base, the clearance spaces being located on the inner wall of the said groove and the lugs being disposed on the outer wall, or at the outer sides of the clearance spaces, so that the normal tendency of the coils when seated in the groove is to remain engaged underneath the lugs by reason of the conformation of the heating element with the shape or form of the groove.

9. A terminal unit assembly for hot plate stoves, comprising a body consisting of an insulation block adapted to be supported adjacent to a stove or similar electric heater for terminal attachment purposes, terminal members extending through the said block and projecting from the opposite ends thereof, nuts applied to the said terminal members at opposite sides of the block and clamping the terminal members to the block, terminal plates having openings through which the corresponding ends of the said terminal members pass, and other nuts screwed on the last mentioned ends of the terminal members to secure the terminal plates firmly thereto, the terminal plates being adapted for connection with the terminal wires of electric resistance used for the stove or heater.

In testimony whereof I affix my signature.

HENRY A. ZIOLA.